United States Patent [19]
Sutor

[11] Patent Number: 5,770,536
[45] Date of Patent: Jun. 23, 1998

[54] FIBER REINFORCED SPRAY MIX

[75] Inventor: Peter T. Sutor, Pittsburgh, Pa.

[73] Assignee: Harbison-Walker Refractories Company, Pittsburgh, Pa.

[21] Appl. No.: 693,034

[22] Filed: Aug. 6, 1996

[51] Int. Cl.$^6$ .................................................. C04B 35/03
[52] U.S. Cl. ..................... 501/95.1; 501/95.2; 501/109; 501/110; 501/112; 501/118; 501/121; 266/280
[58] Field of Search ................................. 501/95.1, 95.2, 501/109, 110, 108, 112, 118, 119, 121, 122; 266/280

[56] References Cited

U.S. PATENT DOCUMENTS

| | | | |
|---|---|---|---|
| 4,759,533 | 7/1988 | Sutor et al. | 266/280 |
| 4,822,679 | 4/1989 | Cerdan-Diaz et al. | 428/392 |
| 5,036,029 | 7/1991 | Johnson | 501/121 |
| 5,073,525 | 12/1991 | Cheng et al. | 501/81 |
| 5,217,929 | 6/1993 | Taft | 501/84 |
| 5,302,563 | 4/1994 | Rumpeltin et al. | 501/111 |
| 5,602,063 | 2/1997 | Dody et al. | 501/108 |

Primary Examiner—Mark L. Bell
Assistant Examiner—Louis M. Troilo
Attorney, Agent, or Firm—Craig G. Cochenour

[57] ABSTRACT

A pulverulent fiber-reinforced spray mix is disclosed in which about 0.02 to 0.3 wt. % of flexible, thermoset polymer fibers resistant to decomposition at a temperature up to about 400° F. are added for each 100 wt. % of other solids in the mix to form a mix which both avoids formation of mat-like structures in the dry hopper of refractory spray apparatus and provides a sprayed lining that is resistant to cracking and peeling during dry-out and preheat. The invention also comprises sprayable compositions formed by admixing water with the mix.

12 Claims, No Drawings

FIBER REINFORCED SPRAY MIX

CROSS-REFERENCE TO RELATED APPLICATION

This application claims the benefit of prior filed copending U.S. Provisional Application No. 60/002,450, filed Aug. 16, 1995.

BACKGROUND OF THE INVENTION

The present invention relates to fiber reinforced spray mixes, sprayable compositions formed therefrom, and resultant sprayed linings.

Insulating boards, which were usually made of deadburned magnesite bonded with a resin, were used for many years to line tundishes. The boards eased the removal of skulls and provided a clean surface for the steel. Over the past 10 years spray mixes have replaced boards. Compared with boards, the spray application is faster and requires less man power.

Refractory spray mixes have been commonly used to coat or form refractory linings on many metallurgical vessels such as ladles, tundishes, and the like. These coatings and linings provide insulation to minimize heat loss and allow frozen metal and/or slag skulls to be easily removed after the vessel has been emptied. Because of the sprayed lining's relatively high insulating value, skulls are generally thinner and the relatively low strength of the coating permits easy separation of the skull from the vessel lining.

Such mixes are sold in dry form, admixed with liquid at the site at which they are to be applied and sprayed onto the surface to give the refractory thickness desired. A typical sprayed tundish lining is applied as a water-based slurry of deadburned magnesite particles often combined with a lower cost refractory filler, binder, and reinforcing fibers. A spray machine is used to mix the powder with water and pump the slurry through a hose and nozzle to the tundish. The slurry is applied at the desired thickness, usually between one and two inches. Reinforcing fibers control the rheology of the slurry and help prevent slumping or sagging off the tundish walls. The reinforcing fibers also prevent cracking due to shrinkage and thermal stresses during dry-out and preheat.

It is conventional to dry such moist layers by several techniques. One is commonly referred to as "cold practice", namely gradually increasing the temperature to between 1000° and 1400° F., holding until dry, and then cooling prior to use. Another is the "hot practice" technique which involves drying at 1000° to 1400° F., cooling, and then preheating the vessel to about 2200° F. prior to use. An alternate "hot procedure" is to dry at about 2200° F. for approximately three hours, the length of time depending on several factors, particularly the thickness of the spray coating applied, and then place the hot vessel immediately into service.

One of the problems with such sprayed mixes has been shrinkage and tendency to crack and peel during drying and preheating. It has been known to use fibers such as shredded paper and chopped fiberglass to prevent such cracking and provide reinforcement. However, it has been noted that paper alone, due to the short cellulose fibers, is not satisfactory. It does not reinforce properly and cannot withstand the high temperatures encountered during drying and preheating and thus cannot help in minimizing the undesirable effects of cracking. Poor heat resistance is also a problem with other organic fibers such as the polyolefins, i.e., polyethylene and polypropylene fibers. Another problem with spray mixes is the proper dispersion of the fibers in the mix as it is being dry mixed at the production plant prior to shipment. Organic fibers presently used tend to form a mat-like structure in the dry mix hopper, making it difficult to convey the dry mix to the wet mixing equipment. With respect to the chopped fiberglass, this is not only an expensive material, but there is some concern about its possible health effects.

SUMMARY OF THE INVENTION

The present invention overcomes the problems of the prior art by providing fibers or staple which can be utilized in place of fiberglass and although degradable at lower temperatures than fiberglass, can satisfactorily prevent the adverse effects of cracking of the sprayed coating during drying and shrinkage thereof. The term "staple" as used herein refers to a textile fiber of relatively short length.

Briefly, the present invention comprises a pulverulent fiber-reinforced spray mix comprising 100 wt. % solids comprising a refractory aggregate and for each such 100 wt. % solids, about 0.02 to 0.3 wt. % of flexible, thermoset polymer fibers resistant to decomposition at a temperature up to about 400° F.

The invention also comprises sprayable compositions formed from such pulverulent mixes and the resultant linings.

OBJECTS AND FEATURES OF THE INVENTION

It is a feature of the present invention to provide spray mixes in which fiberglass is eliminated and in place thereof certain organic fibers are substituted.

It is another general object of the present invention to utilize fibers or staple made of aramid, polyester, or polyamide, or mixtures thereof, preferably those having a melting point over 400° F.

It is still another object of the invention to admix the fibers with the other dry ingredients so as to effect the desired dispersion without formation of any mat-like structure in the dry hopper.

DETAILED DESCRIPTION OF THE INVENTION

There is no criticality as to the refractory aggregate utilized in the instant invention or the other components that are ordinarily added in forming such spray mixes, other than fibers. That is to say, any aggregate suitable for spraying can be utilized and; while preferably a deadburned magnesite is used, other aggregates such as olivine, fireclay, high alumina aggregate, mullite, silicon carbide/graphite mixtures, anthracites, and mixtures thereof can also be utilized. The proportion of the aggregate added is that conventionally utilized to give the heat insulating and other properties desired and can vary, depending upon the needs of the particular metallurgical vessel to which the spray coating is to be applied. Such refractory aggregate comprises at least 90 wt. % and preferably at least about 95 wt. % of the dry mix.

Moreover as is known, additives such as dispersants, binders, plasticizers, and density reducing agents, can be added to the mix in their usual amounts for their intended purposes as is conventional. Such additives ordinarily comprise, at most, about 5 wt. % of the mix. Mixes containing deadburned magnesite and such additives are available commercially under the tradename "DOSSOLITE".

The critical feature of the instant invention is the use of flexible thermoset aramid, polyamide, or polyester fiber or staple (referred to herein collectively as "fiber"), or mixtures thereof to the other spray mix components. As used herein, polyamide refers to synthetic polyamides, as opposed to naturally occurring polyamides, the synthetics most typically being referred to as nylons and Versamid's, the latter being reactive polyamide resins, usually copolymerized with epoxy resins. The aramids are a distinctive class of highly aromatic polyamide fibers which are characterized by their flame-retardant properties and have generally been used for protective clothing, tire cord, and the like. It is important to utilize those having as high a melt temperature as possible, preferably a melt temperature above about 400° F.

It is preferred to utilize a thermoset flexible polyester fiber, particularly those composed of at least 85% by weight of an ester of a dihydric alcohol and terephthalic acid. Such can resist decomposition at temperatures above 400° F. It is also possible to use other thermosetting resin fibers made from alkyd resins, allylic resins, amino resins, epoxy resins, phenolic resins, and urethane resins which can be formed into fibers having a decomposition temperature higher than the temperature about 400° F. As is known to those skilled in the fiber art, substances can be copolymerized with these resins in order to increase their resistance to decomposition at temperatures below 400° F.

It is not critical, although it is preferred that the fiber or staple not be larger than one-half inch in length to prevent any problems of matting in the dry hopper, preferably 0.1 to 0.3 inch in length.

The denier per fiber is not critical and can be any conventionally available denier, suitably about 1 to 2 denier per fiber, preferably 1.5.

If desired, other organic fibers such as cellulose in the form of fibers or shredded paper can be included with the polyester fibers, for example.

It is only essential that the fibers be long enough to be able to reinforce and toughen the refractory so as to prevent cracking due to shrinkage during dryout.

As to proportions of fiber used, while about 0.02 to 0.50 parts by weight of fiber can be used for each 100 wt. % of the other solids, it is preferred to use no more than about 0.075 wt. %.

The fiber is simply admixed with the other components of the mix, but if amounts above about 0.075 wt. % are utilized, care must be taken in the mixing to ensure that no matting occurs.

The dry mix is formed into a sprayable mix in the conventional manner; i.e., by the addition of water at the time of application. The amount of water added is that sufficient to make the composition sprayable utilizing conventional refractory spray machines. The particular amount of water will vary depending mainly on the particular mix composition, but the optimum amount of water can be determined by routine experimentation.

It has surprisingly been found that although these fibers have a melt temperature well below that of fiberglass, they are still able to reinforce the sprayed lining satisfactorily at the temperatures used during drying and heat-up.

The invention will be further described in connection with the foregoing examples which are set forth for purposes of illustration only.

EXAMPLES 1 TO 4

A series of spray mixes whose formulations are set forth in Table I below were prepared and tested. The proportion of components is in weight percent. The mix of Example 4 was a commercial product "DOSSOLITE 1400-72" sold by Daussan et Compagnie, Laboratoire Metallurgique, France.

The mixes were sprayed through a portable spray machine at the same mixing and spray rate and the dispersing and spraying characteristics noted. The results of these tests are set forth in Table II below.

TABLE I

| Example No. | 1 | 2 | 3 | 4 |
|---|---|---|---|---|
| Mix: | | | | |
| Deadburned Magnesite | 67.9% | 68.2% | 68.225% | 67.9% |
| Olivine | 27.5 | 27.5 | 27.5 | 27.5 |
| Additives | 4.1 | 4.1 | 4.2 | 4.1 |
| Polyester Fiber* | 0.5 | 0.2 | 0.075 | — |
| Fiberglass | — | — | — | 0.5 |

*DuPont Dacron polyester, type 257W, 6 mm

TABLE II

| Example No. | 1 | 2 | 3 | 4 |
|---|---|---|---|---|
| Spray Machine | | Reinguss PDSM | | |
| Water Rate, g/m: | — | 1.2 | 1.2 | 1.4 |
| Bulk Density, pcf (Av 3) : | — | 112 | 109 | 109 |
| Spray Characteristics: | | | | |

The mix of Example 1 was not sprayed since the polyester fiber content was too high and it could not be properly handled and sprayed. The mixes of Examples 2, 3, and 4 sprayed well.
The mix of Example 2 had many lumps in the slurry but the lumps were not hard and were full of fines. The mix of Example 4 had less lumps and a smoother sprayed surface than Example 2.

Actual trials in commercial metallurgical vessels showed that the spray mix of Example 4, with both fiberglass and milled paper was slightly better than that of Example 3.

While the invention has been described in connection with a preferred embodiment, it is not intended to limit the scope of the invention to the particular form set forth, but on the contrary, it is intended to cover such alternatives, modifications, and equivalents as may be included within the spirit and scope of the inventions as hereinafter claimed.

What is claimed is:

1. A pulverulent fiber-reinforced spray mix comprising 100 wt. % solids comprising a refractory aggregate and for each 100 wt. % of said solids, about 0.02 to 0.3 wt. % flexible, thermoset polymer fibers resistant to decomposition at a temperature up to about 400° F. and wherein the polymer fibers are selected from the group consisting of thermoset aramid, polyamide, or polyester.

2. The spray mix of claim 1 wherein said refractory aggregate is a deadburned magnesite, olivine, a high alumina aggregate, mullite, a silicon carbide/graphite mixture, an anthracite, or mixtures thereof.

3. The spray mix of claim 2 wherein said refractory aggregate is a mixture of deadburned magnesite and olivine and said polymer fiber is a polyester.

4. The spray mix of claim 3 wherein said polyester fiber is about 0.1 to 0.3 inch in length, about 1 to 2 dernier per fiber, and the amount of fiber is about 0.02 to 0.075 wt. %.

5. A fiber-reinforced sprayable composition comprising 100 wt. % solids comprising a refractory aggregate and for each 100 wt. % of said solids, about 0.02 to 0.3 wt. % flexible, thermoset polymer fibers resistant to decomposition at a temperature up to about 400° F., and water in an amount sufficient to make the composition sprayable and wherein the polymer fibers are selected from the group consisting of thermoset aramid, polyamide, or polyester.

6. The sprayable composition of claim 5 wherein said refractory aggregate is a deadburned magnesite, olivine, a high alumina aggregate, mullite, a silicon carbide/graphite mixture, an anthracite, or mixtures thereof.

7. The sprayable composition of claim 6 wherein said refractory aggregate is a mixture of deadburned magnesite and olivine and said polymer fiber is a polyester.

8. The sprayable composition of claim 7 wherein said polyester fiber is about 0.1 to 0.3 inch in length, about 1 to 2 dernier per fiber, and the amount of fiber is about 0.02 to 0.075 wt. %.

9. A sprayed lining for a metallurgical vessel that is resistant to cracking and peeling during dry-out and preheat comprising the lining formed by spraying the composition of claim 5 onto a surface of a metallurgical vessel.

10. The sprayed lining of claim 9 wherein said refractory aggregate is a deadburned magnesite, olivine, a high alumina aggregate, mullite, a silicon carbide/graphite mixture, an anthracite, or mixtures thereof.

11. The sprayed lining of claim 10 wherein said refractory aggregate is a mixture of deadburned magnesite and olivine and said polymer fiber is a polyester.

12. The sprayed lining of claim 11 wherein said polyester fiber is about 0.1 to 0.3 inch in length, about 1 to 2 dernier per fiber, and the amount of fiber is about 0.02 to 0.075 wt. %.

* * * * *